United States Patent [19]

Schmid et al.

[11] E Patent Number: Re. 32,507

[45] Reissued Date of Patent: Sep. 22, 1987

[54] OPENING ROLLER UNIT FOR OPEN-END SPINNING INSTALLATIONS

[75] Inventors: Friedbert Schmid, Ueberkingen; Hans Raasch, Monchen-Gladbach, both of Fed. Rep. of Germany

[73] Assignees: Fritz Stahlecker; Hans Stahlecker, both of Fed. Rep. of Germany

[21] Appl. No.: 837,727

[22] Filed: Mar. 10, 1986

Related U.S. Patent Documents

Reissue of:

[64] Patent No.: 4,435,953
Issued: Mar. 13, 1984
Appl. No.: 388,219
Filed: Jun. 14, 1982

[30] Foreign Application Priority Data

Jun. 13, 1981 [DE] Fed. Rep. of Germany ..... 3123480

[51] Int. Cl.[4] ..... D01H 7/895; D01H 7/892; D01G 15/28

[52] U.S. Cl. ..... 57/408; 19/97

[58] Field of Search ..... 57/408, 412; 19/97, 19/98, 105, 112, 219, 266

[56] References Cited

U.S. PATENT DOCUMENTS

| | | | |
|---|---|---|---|
| 3,264,690 | 8/1966 | Morrill | 19/97 X |
| 3,800,520 | 4/1974 | Schiltknecht | 57/408 X |
| 4,163,304 | 8/1979 | Laflaquiere et al. | 19/97 |
| 4,196,996 | 4/1980 | Stauffer et al. | 19/97 |
| 4,296,527 | 10/1981 | Eadie | 57/408 X |
| 4,300,265 | 11/1981 | Heinen | 57/408 X |
| 4,352,224 | 10/1982 | Grimshaw et al. | 19/97 |

*Primary Examiner*—Donald Watkins
*Attorney, Agent, or Firm*—Barnes & Thornburg

[57] ABSTRACT

An opening roller unit for open-end spinning installations as a shaft supported in a bearing box and an opening roller arranged on an end of the shaft which projects from the bearing box. The opening roller extends over the bearing box in a manner forming a cavity that is sealed toward the outside with an annular sealing gap and comprises the base member and the ring detachably secured thereto which has a fitting provided on the outer periphery thereof. The detachable ring is mounted upon the base member in a manner blocking the external axis to the cavity. In accordance with one preferred embodiment, the ring of the opening roller extends over the bearing box and the cavity is defined by the ring and bearing box, while the scaling gap is provided between the ring and the bearing box in conjunction with an annular insert attached to the bearing box. In an alternative embodiment, the base member extends over the bearing box and defines the cavity in conjunction therewith, while the detachable ring blocks axis to the cavity by covering radial openings formed in the base. In accordance with an advantageous feature, the frictional connection between the base member and the ring secured thereto is provided by an annular spring band received within an annular groove provided on an outer surface of the base member.

33 Claims, 6 Drawing Figures

OPENING ROLLER UNIT FOR OPEN-END SPINNING INSTALLATIONS

Matter enclosed in heavy brackets [ ] appears in the original patent but forms no part of this reissue specification; matter printed in italics indicates the additions made by reissue.

BACKGROUND AND SUMMARY OF THE INVENTION

The invention concerns an opening roller unit for open-end spinning installations with a shaft supported in a bearing box, an opening roller being arranged on the shaft end projecting from the bearing box for rotation with this shaft end, the opening roller extending over the bearing box while leaving a cavity sealed toward the outside with an annular sealing gap, wherein the opening roller consists of a base member and a ring detachably secured thereto, the outer periphery of this ring being provided with a fitting.

It is known (DOS [German Unexamined Laid-Open Application] No. 2,752,591) to manufacture the opening roller of a base member and a ring attached thereto in a releasable and exchangeable fashion, this ring being provided with the fitting. When the fitting is worn, it is then no longer the entire opening roller with its bearing which is being exchanged, but merely the ring equipped with the fitting. A corresponding procedure is followed if changing of the trimming is desired when changing over to processing another fiber material. By means of this measure, the storage and procuring of spare parts for open-end spinning machines is made more efficient and economical over-all.

In order to protect the bearings of the opening roller shaft, especially the bearing facing the opening roller, from entrance of contaminants, such as fiber remnants, fiber fly, or dust, it is conventional (DOS 2,752,591) to have the opening roller extend over the bearing box, leaving a cavity which is sealed toward the outside by a sealing gap between the bearing box and the opening roller. This sealing gap can, however, not be made so narrow, for practical reasons, that the penetration of dust and dirt can be entirely precluded. This dust and dirt can lead to sluggish operation of the opening roller, which, in turn, can give rise to damage to the drive mechanism or also to a change in the spinning conditions. To free the cavity of impurities, it is necessary in the conventional opening roller units to dismount the opening roller from the shaft. This is a cumbersome and time-consuming procedure.

The invention is based on the object of constructing an opening roller unit of the type mentioned hereinabove so that the zone between the bearing box and the opening roller can be cleaned by relatively simple measures without disassembling the opening roller unit. This object has been attained by covering the cavity toward the outside by a detachable ring.

It is possible due to this construction to make the cavity between the opening roller and the bearing box accessible, by removal of the exchangeable ring of the opening roller, so that this cavity can be readily cleaned out, for example by compressed air or some other tool. This is a simple process wherein it is merely necessary to remove the opening roller unit, but it need not be disassembled into its components. The releasable mounting of the ring outfitted with the fitting is thus exploited for an additional advantage.

In a preferred embodiment of the invention, the provision is made that the cavity is constituted by the ring of the opening roller extending over the bearing box, and that the sealing gap is arranged between the ring and the bearing box or between the ring and a ring insert of the bearing box. It is possible in this embodiment to uncover the cavity entirely so that it is very accessible for inspection as well as for introduction of a tool.

In another embodiment of the invention, the provision is made that the base member of the opening roller extends over the bearing box, thus creating the cavity, and forms the sealing gap with the bearing box and/or with a ring insert mounted on the bearing box, and that the base member is provided in the zone of the cavity with several openings covered by the ring in its operating position. In this embodiment, it is especially simple to clean the cavity by applying a compressed-air tool or a compressed-air nozzle.

In a further embodiment of the invention, a spring-elastic connecting element is arranged between the ring of the opening roller and the base member, this element establishing a frictional connection in the peripheral direction. This results in an especially simple release possibility for the ring of the opening roller.

These and other objects, features and advantages of the present invention will become more apparent from the following description when taken in connection with the accompanying drawings, which show, for purposes of illustration only, several embodiments in accordance with the present invention.

DETAILED DESCRIPTION OF THE PREFERRED EMBODIMENTS

Figure 1:
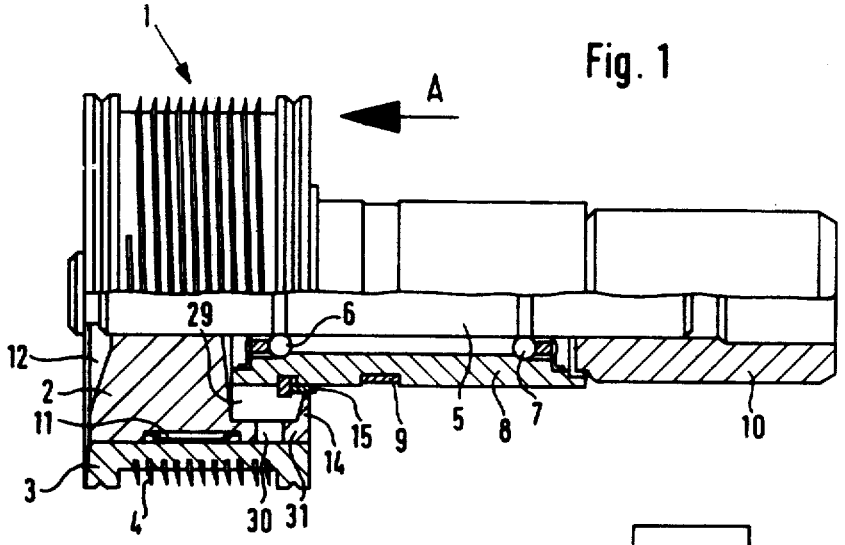
FIG. 1 shows a view, half of which is an axial section, of an opening roller unit of this invention with a sealing gap between a base member of the opening roller and a bearing box.

Opening roller units of the type illustrated in the drawings are utilized in open-end spinning installations. The opening roller 1 has the task of opening up sliver fed by a feeding device as much as possible into individual fibers. For this purpose, the roller is driven at rate of revolution of between 5000 and 12000 per minute.

The opening roller unit of FIG. 1 comprises a shaft 5, supported by means of two ball bearings 6 and 7 running in furrows of the shaft 5 in a cylindrical bearing box 8, the balls of the ball bearings 6 and 7 running against shoulders of the bearing box 8. Both ends of the shaft 5 project past the bearing box 8. One end is equipped with a whorl 10 press-fitted thereon, this whorl being driven by a tangential belt in a way not illustrated in detail. A base member 2 of the opening roller 1 is pressed onto the other end of the shaft 5, and is connected with a ring 3 in a manner precluding relative rotation therebetween. The outer peripheral surface of ring 3 is studded with a fitting 4 comprising a spirally wound sawtooth belt or a large number of individual needles.

The opening roller unit is inserted, in a way not illustrated in detail, in a mounting bore of an opening roller housing wherein the unit is secured by means of a clamping screw passing against a synthetic resin ring 9 inserted in an annular groove of the bearing box 8. The base member 2 of the opening roller 1 is provided with a conical indentation 12 on its externally located end face. The end of the shaft 5 is equipped with an annular collar that projects over this indentation. This end of the shaft 5 thus constitutes an engagement surface for a tool by means of which the opening roller unit can be pulled out of the mounting for the opening roller housing after releasing the clamping screw.

The ring 3 is held detachably on the base member 2 as an exchangeable part, so that in case of wear of the fitting 4 or also when changing over to processing of a different fiber material, the ring 3 can be exchanged. The ring 3 is pushed with a cylindrical internal bore onto the cylindrical outer circumference of the base member 2, a sliding seating being provided between the ring 3 and the base member 2. The ring is attached in the direction of arrow A (FIG. 1). With the aid of a connecting element 11, a frictional connection is established between the base member 2 and the ring 3, acting in the peripheral direction; this connecting element will be described in greater detail below.

The opening roller 1 extends over the end of the bearing box 8 facing this roller in a manner forming a cavity 29. For this purpose, in the embodiment of FIG. 1, the base member 2 is equipped with an extension 31 having the shape of an annular collar and lying in an extension of its outer periphery. The free end of this extension 31 is oriented, with a shoulder 14 having the shape of a ring land, toward the bearing box 8. An annular insert 15 is pushed onto the bearing box 8, the axial position of this insert being determined by a mounting ring. The ring insert 15, which is made of aluminum, for example, forms with the ring land 14, a sealing gap sealing the cavity 29 toward the outside.

Several radial openings 30 are provided in the ring-collar-like extension 31 of the base member 2 and lead to the cavity 29; in the position ready for operation as illustrated in FIG. 1, these openings are covered and sealed by the ring 3.

Under practical conditions, there is the danger that, in spite of the sealing gap between the ring land 14 of the base member 2 and the ring insert 15 of the bearing box 8, fiber residues, fiber fly, dust, or other impurities will pass in the course of time into the cavity 29 and can lead to impeding the operation of the opening roller 1. This cavity 29 can be cleaned if the opening roller unit is dismounted and the ring 3 removed, since in this case the radial openings 30 are uncovered. Then the possibility presents itself to clean the cavity 29, for example, by means of a compressed-air nozzle applied to one of the radial openings 30, blowing out the cavity.

Figure 2:
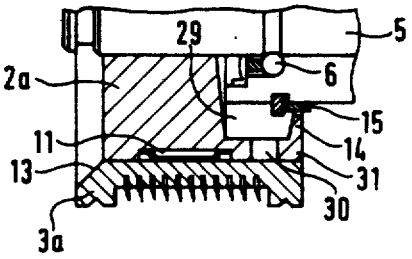
FIG. 2 shows a partial section through the zone of an opening roller of an embodiment similar to FIG. 1.

The embodiment of FIG. 2 corresponds in its basic structure to the embodiment of FIG. 1. The only difference resides in that the end face of the base member 2a does not end with a conical recess 12 but rather with a radial surface. The end of the shaft 5 is provided with an annular collar that projects past this radial surface into a recessed bevel area 13 of ring 3a which, likewise, projects toward the outside past the radial surface of the base member 2a.

Figure 3:
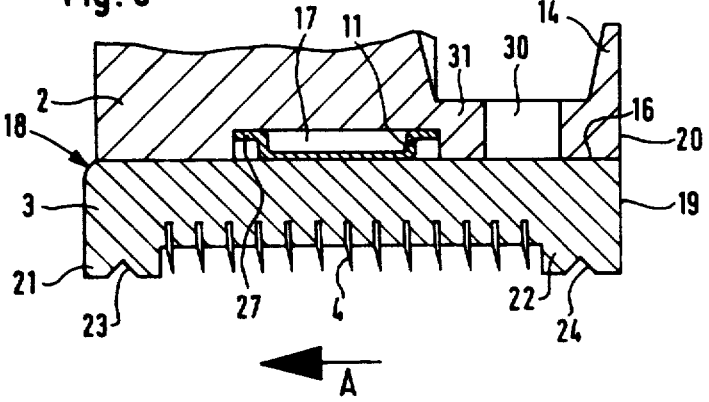
FIG. 3 shows a partial section on an enlarged scale through an embodiment similar to FIGS. 1 and 2.

In FIG. 3, the embodiment of FIG. 1 is shown on an enlarged scale. The ring 3 is pushed, in the direction of arrow A, onto the outer surface 16 of the base member 2, by means of a tool to such an extent that the end faces 19 of the ring 3 and 20 of base member 2 which face the bearing box 8, are in flush alignment, so that the base member can serve as a support for the tool. An annular groove 17 is provided in the outer surface 16 of the base member 2, the connecting element 11, individually illustrated in FIGS. 4 and 5, being inserted in this groove. This connecting element 11 consists of an annularly curved spring band whose ends slightly overlap in the zone 28 (see FIG. 5). The width of the spring band corresponds approximately to the width of the annular groove 17 of the base member 2. The spring band is provided with corrugations (crimps) 25 at regular intervals 26; these corrugations do not extend over the full width of the spring band so that flat edges 27 are located on both sides beside the corrugations. The corrugations 25 are oriented radially toward the outside and are dimensioned so that, with the ring 3 not being mounted, they slightly project beyond the outer surface 16 of the base member 2. Thus, by the mounting of the ring 3, the corrugations are slightly deformed elastically whereby the edges 27 are shifted so as to be braced against said walls of the annular groove 17. To facilitate pushing the ring 3 onto the base member 2 and, above all, over the connecting element 11, the end face of the ring 3 lying in front as seen in the mounting direction A is fashioned so that it passes over, with a rounded portion 18, into the inner bore of the ring 3.

The rings 3, 3a, 3b are equipped with annular collars 21 and 22 laterally delimiting the fitting 4; the radial length of these collars corresponds at least to the radial length of the teeth or needles of the fitting 4. In view of the rate at which opening rollers revolve, it is necessary to balance same, and in this connection it is possible to balance the base member 2 and the rings 3 individually. To facilitate the balancing of the rings 3 by the provision of balancing bores, the annular collars 21 and 22 are equipped with annular grooves 23 and 24 having a V-shape in cross section. It is thereby possible to apply a drill in the annular grooves 23 and 24 without having to arrange for special guides for the drill.

Figure 6:
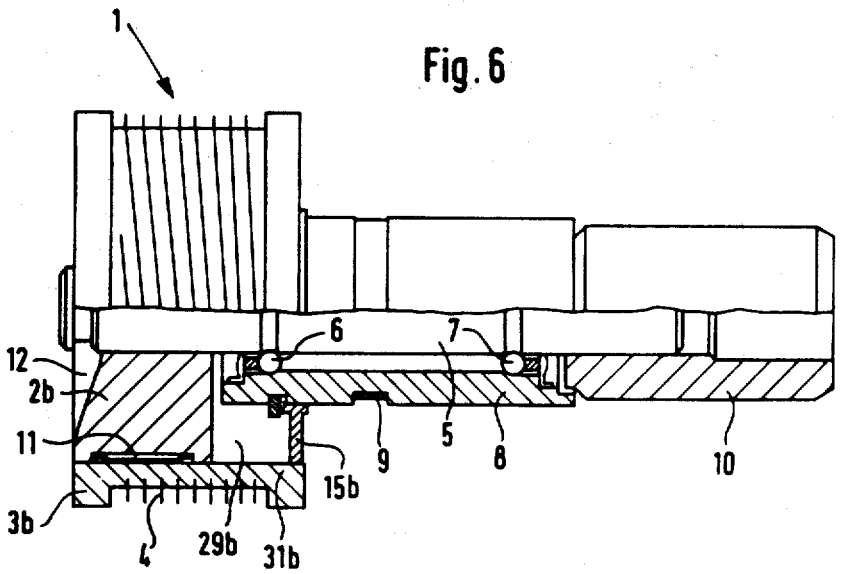
FIG. 6 shows a view, half of which is an axial section, of an opening roller unit according to this invention wherein the cavity and the sealing gap are constituted by the exchangeable ring of the opening roller.

The embodiment of FIG. 6 corresponds in its basic structure to the embodiments of FIGS. 1–3. With the aid of two ball bearings 6 and 7, a shaft 5 is supported in a bearing box 8, this shaft projecting past the bearing box 8 at both ends. A whorl 10 is press-fit on one end. On the other end, a base member 2b of an opening roller 1 is attached by pressure. The cylindrical bearing box 8 is also provided, in this embodiment, with a synthetic resin ring 9 utilized for mounting same in the opening roller housing. The free end face of the base member 2b is also equipped, in this embodiment, with a conical recess 12, by means of which the end of the shaft 5 provided with a recessed portion is uncovered. The ring 3b, carrying a fitting 4 between annular collars on its outer periphery, terminates flush with the externally disposed end face of the base member 2b.

In the embodiment of FIG. 6, the side of the base member 2b, facing the bearing box 8 terminates with a radial surface. The ring 3b extends past this radial surface in the direction toward the bearing box 8 and thus extends over the end of the bearing box 8 facing the opening roller 1. This zone 31b of the ring 3b projecting past the base member 2b forms a cavity 29b which is sealed toward the outside by a sealing gap. This sealed gap exists between an annular insert 15b, pressed onto the bearing box 8 and abutting a mounting ring, and the inner bore of the ring 3b.

Figure 4:
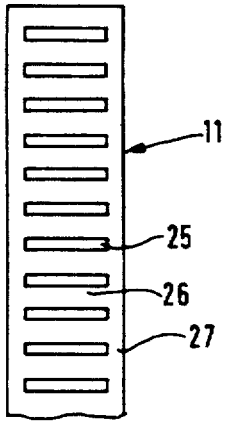
FIG. 4 shows a view of a spring element, projected into a plane, for connecting the ring and the base member of an opening roller, on a scale corresponding to FIG. 3.
Figure 5:
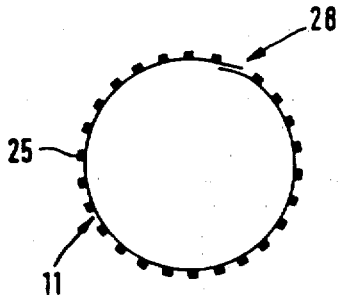
FIG. 5 is a lateral view of the spring element of FIG. 4 on a smaller scale.

The ring 3b, placed on the base member 2b with a sliding fit, is connected in a frictional connection to the base member 2b, with the aid of the connecting element 11 described, in particular, with reference to FIGS. 3–5, in the peripheral direction. By pulling off the ring 3b, the cavity 29b is completely uncovered in this embodiment so that it can be inspected and is also accessible, for example, for a mechanical cleaning implement, without having to pull the opening roller 1 or its base member off the shaft 5.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. Opening roller unit for open-end spinning installations having a shaft supported in a bearing box, and an opening roller being arranged on an end of the shaft which projects from the bearing box for rotation with said shaft, the opening roller extending over the bearing box in a manner forming a cavity that is sealed toward the outside with an annular sealing gap, wherein the opening roller comprises a base member and a ring detachably secured thereto, the outer periphery of said ring being provided with a fitting, and wherein external access to said cavity is blocked by said ring.

2. Opening roller unit according to claim 1, wherein said cavity is defined by the ring of the opening roller extending over the bearing box; and wherein the sealing gap is provided between the ring and the bearing box.

3. Opening roller unit according to claim 2, wherein an annular insert is attached to the bearing box, and said ring forms the cavity and the sealing gap in conjunction with said annular insert.

4. Opening roller unit according to claim 3, wherein the ring of the opening roller has a cylindrical internal bore which is pushed onto the base member and over said annular insert.

5. Opening roller unit according to claim 1, wherein the base member of the opening roller extends over the bearing box and forms, with the bearing box, said cavity and the sealing gap; and wherein the base member is provided, in the zone of the cavity, with several openings for providing access to said cavity, said openings being covered by the ring when it is secured on the base member in an operating position.

6. Opening roller unit according to claim 5, wherein the base member forms said cavity and the sealing gap in conjunction with an annular insert that is attached to the bearing box.

7. Opening roller unit according to claim 5 or 6, the openings of the base member of the opening roller terminate in a cylindrical outer surface onto which the ring is pushed.

8. Opening roller unit according to claim 7, wherein a spring-elastic connecting element for establishing a frictional connection in a peripheral direction is arranged between the ring of the opening roller and the base member.

9. Opening roller unit according to claim 8, wherein an annular groove is provided in an outer surface of the base member, said spring-elastic element comprising an annular spring band inserted in said groove, said spring band being equipped with corrugations which project past the outer surface of the base member when said ring is detached.

10. Opening roller unit according to one of claims 1–6, wherein a spring-elastic connecting element for establishing a frictional connection in a peripheral direction is arranged between the ring of the opening roller and the base member.

11. Opening roller unit according to claim 10, wherein an annular groove is provided in an outer surface of th base member, said spring-elastic element comprising an annular spring band inserted in said groove, said spring band being equipped with corrugations which project past the outer surface of the base member when said ring is detached.

12. Opening roller unit according to claim 11, wherein an end face of the ring of the opening roller lying in front, as seen in a mounting direction, has a rounded portion which adjoins an inner mounting bore of the ring.

13. Opening roller unit according to claim 8, wherein an end face of the ring of the opening roller lying in front, as seen in a mounting direction, has a rounded portion which adjoins an inner mounting bore of the ring.

14. Opening roller unit according to claim 7, wherein an end face of the ring of the opening roller lying in front, as seen in a mounting direction, has a rounded portion which adjoins an inner mounting bore of the ring.

15. Opening roller unit according to claim 12, wherein said annular ring is equipped with ring collars between which the fitting is arranged, annular grooves of a V-shape in cross section being formed in said ring collars.

16. Opening roller unit according to claim 7, wherein said annular ring is equipped with ring collars between which the fitting is arranged, annular grooves of a V-shape in cross section being formed in said ring collars.

17. Opening collar unit according to claim 4, wherein said annular ring is equipped with ring collars between which the fitting is arranged, annular grooves of a V-shape in cross section being formed in said ring collars.

18. Opening roller unit according to claim 1, wherein said annular ring is equipped with ring collars between which the fitting is arranged, annular grooves of a V-shape in cross section being formed in said ring collars.

*19. Opening roller ring assembly for an opening roller unit for open-end spinning installations of the type having a shaft supported in a bearing box, and an opening roller base member unit arranged on an end of the shaft which projects from the bearing box for rotation with said shaft with the opening roller base member unit extending over the bearing box in a manner forming a cavity with an annular sealing gap, said opening roller ring assembly comprising:*

*a ring member, and*

*fitting means projecting outwardly from the outer circumference of the ring member, said ring member*

*being detachably connectable to the opening roller base member unit for accommodating interchangeability of the roller ring assembly, wherein said ring member is configured to block access from the outside to an annular sealing gap in said base member unit when in an assembled in use position on the opening roller base member unit and to permit access to the annular sealing gap when displaced from said assembled in use position.*

*20. Opening roller ring assembly according to claim 19, wherein said ring member has a cylindrical internal bore which is slidably pushed onto the base member unit and over opening means to the sealing gap in the base member unit.*

*21. Opening roller ring assembly according to claim 19, further comprising spring elastic means engageable between the base member unit and ring member to detachably frictionally connecting the ring member to the base member unit.*

*22. Opening roller ring assembly according to claim 21, wherein said ring member has a cylindrical internal bore which is slidably pushed onto the base member unit and over opening means to the sealing gap in the base member unit.*

*23. Opening roller ring assembly according to claim 21, wherein said spring elastic means comprises an annular spring band insertable in a groove of the base member unit and equipped with corrugations which project radially outwardly of the base member unit when in position on the base member unit with the ring member detached therefrom.*

*24. Opening roller ring assembly according to claim 19, wherein said ring member has a rounded internal bore portion at its end designed for assembly onto the base member unit with said rounded internal bore portion merging with an inner mounting bore.*

*25. Opening roller ring assembly according to claim 19, wherein said ring member is equipped with ring collars between which the fitting is arranged and wherein annular grooves of a V-shaped cross section are formed in said ring collars for accommodating alignment of balancing holes in said ring member.*

*26. Opening roller ring assembly according to claim 21, wherein said ring member has a rounded internal bore portion at its end designed for assembly onto the base member unit with said rounded internal bore portion merging with an inner mounting bore of said ring member.*

*27. Opening roller ring assembly according to claim 26, wherein said spring elastic means comprises an annular spring band insertable in a groove of the base member unit and equipped with corrugations which project radially outwardly of the base member unit when in position on the base member unit with the ring member detached therefrom.*

*28. Opening roller ring assembly according to claim 27, wherein said ring member is equipped with ring collars between which the fitting is arranged and wherein annular grooves of a V-shaped cross section are formed in said ring collars for accommodating alignment of balancing holes in said ring member.*

*29. Method of installing an opening roller ring assembly on an opening roller unit for open-end spinning installations of the type having a shaft supported in a bearing box, and an opening roller base member unit arranged on an end of the shaft which projects from the bearing box for rotation with said shaft with the opening roller base member unit extending over the bearing box in a manner forming a cavity with an annular sealing gap, said method comprising:*

*selecting a ring assembly having a ring member and fitting means projecting outwardly from the outer circumference of the ring member, said ring member exhibiting an internal bore, and*

*placing said ring member with its internal bore over the base member unit in such a manner as to block access from the outside to the annular sealing gap when in an in use assembled position, said access being open when the ring member is displaced from its in use assembled position.*

*30. Method according to claim 29, further comprising disposing spring elastic means between the base member unit and ring member to aid in frictionally connecting the ring member to the base member unit.*

*31. Method according to claim 30, wherein said spring elastic means comprises an annular spring band insertable in a groove of the base member unit and equipped with corrugations which project radially outwardly of the base member unit when in position on the base member unit with the ring member detached therefrom.*

*32. Method according to claim 29, wherein said ring member is equipped with ring collars between which the fitting is arranged and wherein annular grooves of a V-shaped in cross section are formed in said ring collars for accommodating alignment of balancing holes in said ring member.*

*33. Method according to claim 31, wherein said ring member is equipped with ring collars between which the fitting is arranged and wherein annular grooves of a V-shaped in cross section are formed in said ring collars for accommodating alignment of balancing holes in said ring member.*

* * * * *

US00RE32507C1

(12) REEXAMINATION CERTIFICATE (4624th)

United States Patent

Schmid et al.

(10) Number: US RE32,507 C1

(45) Certificate Issued: Aug. 13, 2002

(54) OPENING ROLLER UNIT FOR OPEN-END SPINNING INSTALLATIONS

(75) Inventors: Friedbert Schmid, Ueberkingen; Hans Raasch, Monchen-Gladbach, both of (DE)

(73) Assignees: Fritz Stahlecker, Bad Uberkingen; Hans Stahlecker, Sussen, both of (DE)

Reexamination Request:
No. 90/005,634, Feb. 8, 2000

Reexamination Certificate for:

| | |
|---|---|
| Patent No.: | **Re. 32,507** |
| Issued: | **Sep. 22, 1987** |
| Appl. No.: | **06/837,727** |
| Filed: | **Mar. 10, 1986** |

Related U.S. Patent Documents

Reissue of:

| | |
|---|---|
| (64) Patent No.: | **4,435,953** |
| Issued: | **Mar. 13, 1984** |
| Appl. No.: | **06/388,219** |
| Filed: | **Jun. 14, 1982** |

(30) Foreign Application Priority Data

Jun. 13, 1981 (DE) ..... 3123480

(51) Int. Cl.[7] ..... D01H 4/32; D01H 4/30; D01G 15/28

(52) U.S. Cl. ..... 57/408; 19/97

(58) Field of Search ..... 57/408, 412; 19/97, 19/98, 105, 112, 219, 266

(56) References Cited

U.S. PATENT DOCUMENTS

| | | | |
|---|---|---|---|
| 2,938,242 | A | 5/1960 | Schiltknecht |
| 4,067,625 | A | 1/1978 | Goldammer |
| 4,300,265 | A | 11/1981 | Heinen |

*Primary Examiner*—Danny Worrell

(57) ABSTRACT

An opening roller unit for open-end spinning installations as a shaft supported in a bearing box and an opening roller arranged on an end of the shaft which projects from the bearing box. The opening roller extends over the bearing box in a manner forming a cavity that is sealed toward the outside with an annular sealing gap and comprises the base member and the ring detachably secured thereto which has a fitting provided on the outer periphery thereof. The detachable ring is mounted upon the base member in a manner blocking the external axis to the cavity. In accordance with one preferred embodiment, the ring of the opening roller extends over the bearing box and the cavity is defined by the ring and bearing box, while the scaling gap is provided between the ring and the bearing box in conjunction with an annular insert attached to the bearing box. In an alternative embodiment, the base member extends over the bearing box and defines the cavity in conjunction therewith, while the detachable ring blocks axis to the cavity by covering radial openings formed in the base. In accordance with an advantageous feature, the frictional connection between the base member and the ring secured thereto is provided by an annular spring band received within an annular groove provided on an outer surface of the base member.

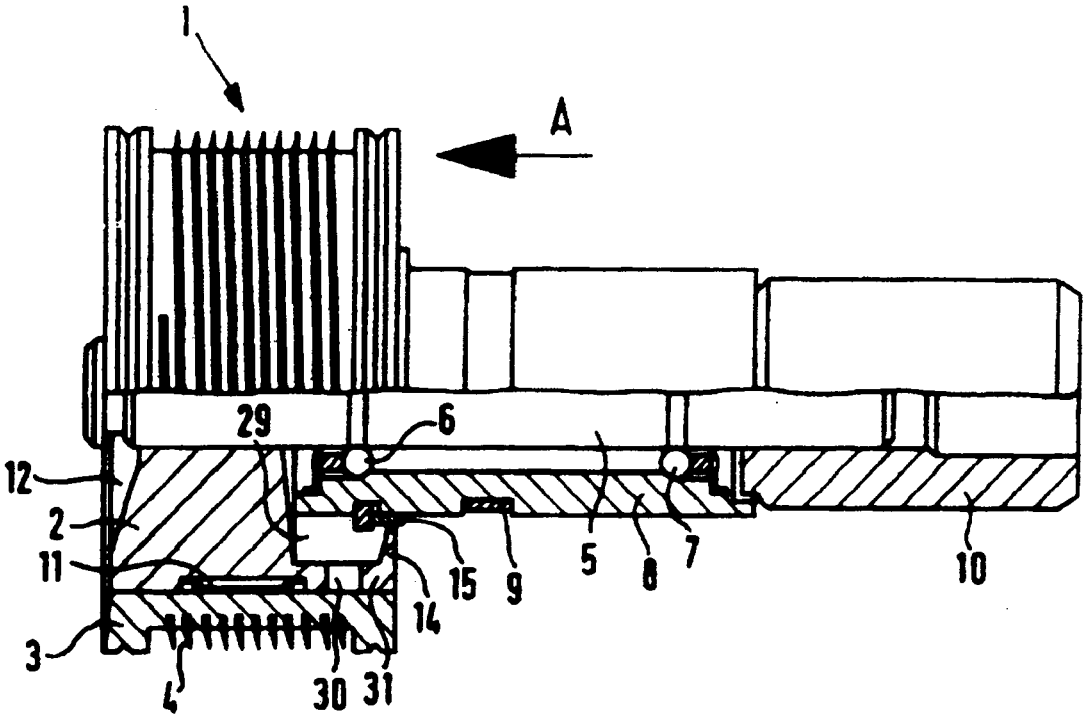

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT :

The patentability of claims 1–33 is confirmed.

* * * * *